June 14, 1932.  J. V. PUGH  1,862,805
VEHICLE WHEEL
Filed Oct. 1, 1928  2 Sheets-Sheet 2

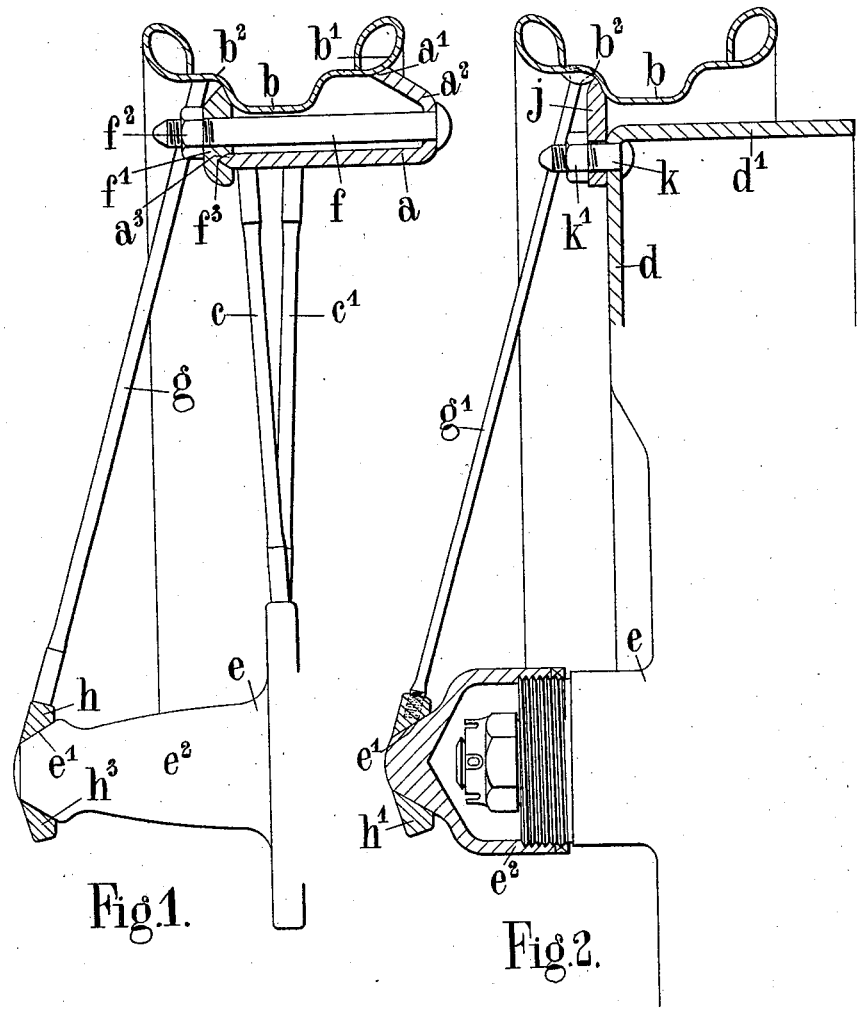
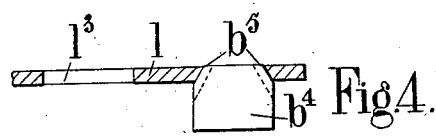

J. V. Pugh
INVENTOR
By: Marks & Clark
Attys.

Patented June 14, 1932

1,862,805

UNITED STATES PATENT OFFICE

JOHN VERNON PUGH, OF MERIDEN, ENGLAND

VEHICLE WHEEL

Application filed October 1, 1928, Serial No. 309,640, and in Great Britain November 4, 1927.

This invention relates to vehicle wheels of the type having wire or like spokes which are subjected to tension and in which the spokes or other rim-supporting means upon the two opposite sides of the wheel are connected to independent members say at the two ends of a hub or equivalently positioned so that tension in the spokes may be regulated by moving said members relative to one another in the direction of the axis of rotation of the wheel.

Removal of a tyre altogether with its supporting rim, spokes and hub parts which may be attached thereto in many cases calls for a considerable amount of manipulation and when a spare part is carried for purposes of replacement this is often heavy and expensive.

The object of the present invention is to overcome the foregoing objections and to provide a vehicle wheel structure having other advantages.

The invention consists in a vehicle wheel and cooperating brake drum structure in which a brake drum is attached to a shaft or hub more or less permanently by means adapted to withstand the stresses due to load and torsion while a detachable tyre-carrying rim with means such as spokes adapted to resist side stresses is securely supported on the brake drum structure and the spokes or the like are tensioned while completing attachment of the rim.

The invention further consists in a wheel and brake drum structure in accordance with the preceding paragraph in which a tyre rim having a set of spokes appoximating to a conical surface with their roots connected in a concentric ring is mounted upon a brake drum provided with means adapted to engage said rim and draw it into position thereon while the spoke root ring is held extended upon a central abutment.

The invention further consists in a wheel and brake drum structure in accordance with the preceding paragraph in which the rim is provided preferably adjacent to the spoke points with an internal flange or series of lugs for accommodating threaded members whereby the rim is drawn on to the brake drum.

The invention further consists in a wheel and brake drum structure as indicated in which a tyre rim having a set of spokes approximating to a conical surface with their roots collected in a concentric ring is adapted to be positioned upon a brake drum and after rotational movement thereon drawn back to engage wedging members with which it is held in close contact by a member which is mounted upon a central abutment and forced back against a spoke root ring positioned thereon.

The invention also consists in improvements in or relating to vehicle wheels as hereinafter described.

Referring now to the accompanying drawings:—

Figure 1 shows one way of carrying the invention into effect when using a supporting flange on the brake drum;

Figure 2 shows another form in which the brake drum is not flanged;

Figure 4 and 5 are details of the construction shown in Figure 3;

Figures 3, 6:
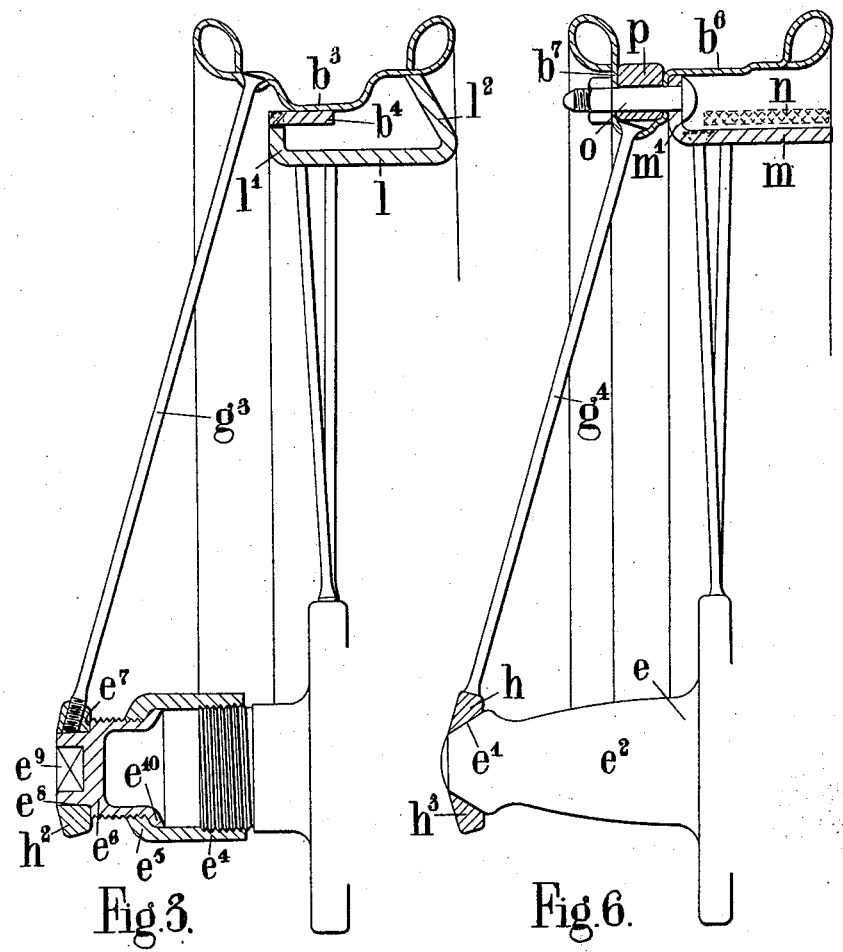
Figure 3 shows a different way of attaching the tyre-carrying rim.
Figure 6 shows a brake drum adapted to be engaged by external gripping means.

In carrying the invention into effect in the convenient form illustrated by way of example in Figure 1 of the drawings a brake drum $a$ of comparatively large diameter, say for example slightly less than the inside diameter of the tyre rim $b$, is supported in any convenient manner such as the spokes $c$, $c'$ of Figure 1, disc $d$ of Figure 2 or other construction from an inner permanent hub part or a rotating axle $e$, the connection being of a nature which is not necessarily adapted for rapid detachability and the brake drum supporting structure such as the spokes, disc or the like before referred to being of a nature which will satisfactorily resist the torsional stresses due to braking and driving in both directions and also if the brake rings are considered as being supported upon the ground or a floor to be sufficiently strong to support the generally vertical load of the vehicle.

In Figure 1 the friction surface of the brake drum $a$ is upon the interior side thereof and the before-mentioned supporting structure of whatever nature is adopted will be connected to the outer edge of the drum ring so as to leave the inner surface free as shown.

The brake drum $a$ is made of a kind of channel or angle section but other sections may be employed and the exterior surface is provided as shown at $a'$ with a cylindrical band or edge upon which the slightly bevelled or curved surface of the bead $b'$ of the tyre-carrying rim may be supported and centred.

Round about the exterior of the brake drum $a$ there is provided a series of threaded tension members $f$ which pass through holes in the flange or like projection $a^2$ of the brake drum and have dogs or clips $f'$ movably fitting upon the ends which are remote from the vehicle of the tension members and held thereon by nuts $f^2$ screwed upon the threads.

The dogs or clips $f'$ are of such a nature that they can be swung round or laid down for the purpose of the tyre rim $b$ being slid into position over them on to the brake drum $a$ and they are then moved to engage by means of the grooves $f^3$ the abutment or V-shaped edge $a^3$ of the brake ring $a$ and the side $b^2$ remote from the vehicle of the well of the tyre-carrying rim and the nuts $f^2$ are tightened up as hereinafter more fully described.

The rim $b$ which carries the tyre is provided upon the side remote from the vehicle with a set of tension spokes $g$ arranged to approximate to the surface of a cone of moderate contained angle and the roots of these spokes are connected to a central ring-like member $h$ in any suitable manner say for example by welding, screwing or by threading hairpin loop spokes therethrough as described in my British application No. 27,960 of 1927.

The concentric spoke root ring $h$ of the tyre-carrying rim and spoke structure is positioned on a cone frustum surface $e'$ upon a stud or cap $e^2$ extending from the permanent part $e$ of the hub or axle end and it abuts against the cone surface when the tyre-carrying rim $b$ has been positioned sufficiently far upon the exterior of the brake drum $a$ for the clips $f'$ to be brought into engagement with the abutment edge $a^3$ of the brake drum and the well surface $b^2$ of the tyre-carrying rim $b$. The nuts $f^2$ of the threaded members $f$ are then tightened up so as to draw the tyre-carrying rim $b$ right home upon the exterior of the brake drum $a$ and at the same time to subject the spokes $g$ of the tyre-carrying rim to the desired tension to enable them to resist any side stresses which may be imposed upon the combined wheel and brake drum structure.

In the form shown by way of example in Figure 2 the loose clips or the like $f'$ provided on the threaded members $f$ attached to the brake drum structure $a$ are replaced by a series of lugs or a continuous ring $j$ which may be suitably attached as by welding or the like to the outer side $b^2$ of the well of the tyre-carrying rim $b$, the lugs or ring $j$ being provided with apertures to accommodate bolts, studs or other threaded members $k$ projecting from a suitable region of the brake drum structure which is here shown formed as one piece with friction ring $d'$ and disc central portion $d$. Nuts $k'$ upon the bolts or the like $k$ are then employed for drawing the tyre-carrying rim $b$ into its final position upon the brake drum ring $d'$ and subjecting the spokes $g'$ to the necessary tension.

Figure 5:
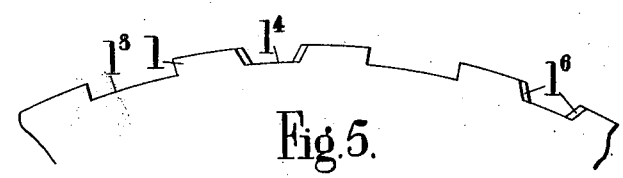

Figure 3 shows another way of carrying the invention into effect in which the interior of the tyre-carrying rim which is shown as the side nearest the axis of the bottom of the central well $b^3$ is provided with a series of wedge-shaped elements $b^4$ firmly fastened thereto and the brake drum $l$ is provided with two exterior flanges $l'$, $l^2$ say of a more or less channel section element. The flange $l'$ has gaps $l^3$ cut therein through which these wedge-shaped elements $b^4$ may slide while the tyre-carrying rim $b$ is positioned upon the brake drum $l$. The wedge-shaped elements $b^4$ are tapered as shown at $b^5$ Figure 4 with their greatest width adjacent to the vehicle and the flange $l'$ of the brake drum is provided in between the before-mentioned gaps $l^3$ with a series of narrower gaps $l^4$, Figure 5, having tapering sides $l^6$ complementary to the sides $b^5$ of the wedge-shaped elements $b^4$. When the tyre-carrying rim has been positioned upon the brake drum exterior by sliding the wedge-shaped elements $b^4$ through the wider gaps $l^3$ it is turned through a small angle until the wedge-shaped elements are opposite the tapering gaps $l^4$ and the tyre-carrying rim is drawn back a sufficient amount to cause the wedge-shaped elements $b^4$ to enter the tapering gaps $l^4$.

In the last-described construction the cap $e^4$ upon the projecting portion of the hub part or axle end and upon which the concentric spoke root ring $h^2$ is positioned is provided with an inturned shoulder $e^5$ having a screw thread and a nut or plug-like member $e^6$ having an abutment surface $e^7$, spigot $e^8$ and square or like central engaging cavity $e^9$ is positioned therein. The nut or plug-like member $e^6$ is screwed as far as possible into the cap $e^4$ on the hub or shaft end while the spoke root ring $h^2$ is positioned thereon and the tyre-carrying rim $b$ connected with the brake drum $l$ as already described and the plug or nut member is then screwed back to press against the concentric spoke root ring $h^2$ so as to tension the spokes $g^3$ and draw the wedge-shaped elements $b^4$ of the rim tightly into the tapering gaps $l^4$ of the brake drum. A stop $e^{10}$ is provided to prevent over tensioning of the spokes.

The spoke root ring for the construction last described may conveniently be formed as the hollow frustum of a cone the smaller diameter end of which faces towards the vehicle and the abutment upon the nut may be in the form of a channel section rim having an interior conical surface complementary to the exterior surface of the hollow frustum ring so that screwing back the nut will centre the spoke root ring in addition to forcing it in an outward direction.

In the construction shown in Figure 6 the tyre-carrying rim $b^6$ has a well $b^7$ positioned upon the side thereof remote from the vehicle and the spokes $g^4$ pass from the bottom of the well to a central ring $h^3$.

The brake ring $m$ is adapted to co-operate with an outside band $n$ and is provided with a flange $n'$ upon the side of the ring remote from the vehicle which flange abuts against one side of the well $b^7$ of the tyre-carrying rim and the brake ring and tyre-carrying rim are held together by bolts $o$ passing through apertures in the two sides and through a filling piece $p$ inserted in the well to prevent deflection of the sides thereof.

The external brake $n$ may be of any known or convenient form for engaging the exterior of the brake ring $m$ and in other respects this construction functions as already described with reference to the constructions shown in Figures 1 and 2 of the drawings.

By operating in accordance with the invention large diameter brake ring surfaces may be readily provided and these surfaces and the material from which they are formed are subjected to a free circulation of air which prevents overheating of the brake. At the same time the tyre-carrying rim is prevented from receiving any large amount of heat from the brake ring and damage to the tyre is thus obviated.

Having now described my invention, what I claim as new and desire to secure by Letters Patent is:—

1. A vehicle wheel and co-operating brake drum structure including a brake drum attached to a shaft or hub more or less permanently by means adapted to withstand the stresses due to load and torsion, a detachable tyre-carrying rim securely supported on the brake drum structure and having a single set of axially deflectable spokes which are tensioned while completing attachment of the rim to the brake drum.

2. A vehicle wheel and brake drum structure including a tyre rim having a set of spokes approximating to a conical surface with their roots connected in a concentric ring, a central abutment on which said ring is mounted and a brake drum whereon said rim is mounted provided with means adapted to engage said rim and draw it into position thereon while the spoke root ring is held extended upon said central abutment.

3. A vehicle wheel and brake drum structure including a tyre rim having a set of spokes approximating to a conical surface with their roots collected in a concentric ring, a series of wedge-shaped elements fastened within said rim, a brake drum, a flange on said brake drum, a series of gaps adapted to pass said elements in said flange, a series of smaller gaps to retain said elements between said larger gaps, a central abutment and a member which is mounted upon said central abutment and forced back against said spoke root ring to hold said wedge-shaped elements in said smaller gaps.

4. A vehicle wheel comprising a rim adapted to completely support a tyre, a concentric nave element to one side thereof, an abutment of an axle fitting engaging said nave element, wire spokes connecting said rim with said nave element, a brake drum supported from said axle fitting, means for firmly supporting said rim upon said brake drum and means for effecting relative axial movement between said nave element and brake drum to tension the spokes connected to the rim.

In testimony whereof I have signed my name to this specification.

JOHN VERNON PUGH.